United States Patent
Raiche et al.

(10) Patent No.: US 8,771,786 B2
(45) Date of Patent: Jul. 8, 2014

(54) METHOD FOR REPAIR OF A COMPONENT OF A TURBOMACHINE AND A COMPONENT REPAIRED ACCORDING TO THIS METHOD

(71) Applicant: MTU Aero Engines GmbH, Munich (DE)

(72) Inventors: Michael Raiche, Munich (DE); Christian Heinzelmaier, Puchheim (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 13/713,799

(22) Filed: Dec. 13, 2012

(65) Prior Publication Data

US 2013/0171343 A1  Jul. 4, 2013

(30) Foreign Application Priority Data

Dec. 15, 2011  (EP) .................................... 11193682

(51) Int. Cl.
*F01D 21/04* (2006.01)
*F01D 5/02* (2006.01)
*B05D 5/00* (2006.01)
*B23P 6/00* (2006.01)
*F01D 5/00* (2006.01)

(52) U.S. Cl.
CPC ............ *B05D 5/005* (2013.01); *F05D 2240/80* (2013.01); *F01D 21/045* (2013.01); *F01D 5/027* (2013.01); *B23P 6/007* (2013.01); *F01D 5/005* (2013.01)

USPC .......................... 427/140; 427/142; 427/421.1

(58) Field of Classification Search
CPC ........... B05D 5/005; B23P 6/00; B23P 6/007; F01D 5/005; F01D 5/027; F01D 21/045; F05D 2240/80
USPC ........... 427/140, 142, 421.1, 422, 427, 427.1, 427/427.2, 427.3
See application file for complete search history.

(56) References Cited

U.S. PATENT DOCUMENTS

2009/0282678 A1* 11/2009 Williams et al. ............. 29/889.1
2011/0255980 A1* 10/2011 Heinzelmaier et al. ... 416/204 R

FOREIGN PATENT DOCUMENTS

EP  1188900 A2  3/2002
EP  2119870 A2  11/2009

* cited by examiner

*Primary Examiner* — Dah-Wei D Yuan
*Assistant Examiner* — Nga Leung V Law
(74) *Attorney, Agent, or Firm* — Barlow, Josephs & Holmes, Ltd.

(57) ABSTRACT

A method is disclosed for the repair of a component of a turbomachine, in particular a rotor of an aircraft gas turbine, with blades taken up in at least one groove and with at least one support region for limiting a blade tilt angle, whereby at least one segment, which has been subjected to wear, of the support region of the component is removed, and a coating that can be introduced in the unit on at least one supporting surface of at least one blade is formed on the component for limiting the blade tilt angle. In addition, a component of a turbomachine, in particular a rotor of an aircraft gas turbine, with at least one such repair site is disclosed.

9 Claims, 7 Drawing Sheets

METHOD FOR REPAIR OF A COMPONENT OF A TURBOMACHINE AND A COMPONENT REPAIRED ACCORDING TO THIS METHOD

BACKGROUND OF THE INVENTION

The invention relates to a method for the repair of a component of a turbomachine, in particular a rotor of an aircraft gas turbine, according to the preamble of patent claim 1 as well as a component according to patent claim 10.

According to conventional methods for the repair of a component of a turbomachine, for example, a compressor rotor of an aircraft gas turbine, with blades taken up in grooves and with a support region for limiting the blade tilt angle, segments of the support region of the component that have been subjected to wear are removed during the repair. For example, the repair of a compressor rotor can be accomplished by means of setting back a rotor region in the radial direction, a so-called depression or rounding out.

It is a disadvantage in these repair methods and in components repaired in this way that, due to the removal of a support segment after a repair of the rotor, the tilt angle of the blades in the axial direction can increase in such a way that the blade tilt angle adjusted when the engine is shut down limits or prevents the radial blade alignment brought about by centrifugal force during engine operation. This is a frequent cause of blade root damage and breaks during engine operation. In addition, it is a disadvantage that a rotor imbalance can occur due to the removal of component segments in the repaired rotor region and the mass reduced thereby.

BRIEF SUMMARY OF THE INVENTION

In contrast to this, the object of the invention is based on creating a method for the repair of a component and a repaired component, in which the resulting component strength satisfies the highest requirements for operating safety, and the service life of the component prior to the repair is not adversely affected.

This object is solved by means of a repair method with the features of patent claim 1 as well as by a component according to patent claim 10.

According to the method of the invention for the repair of a component of a turbomachine, for example, a rotor of an aircraft gas turbine, with blades taken up in at least one groove and with at least one support region for the blades for limiting the blade tilt angle, at least one segment, which has been subjected to wear, of the support region of the component is removed, and a coating that can be introduced on the component is formed in the unit on at least one supporting surface of at least one blade in order to limit the blade tilt angle. According to the invention, a coating is introduced in the repair region for a defined limiting of the blade tilt. In a repair of a component, such as a compressor rotor of an aircraft gas turbine in particular, by means of setting back a rotor region in the radial direction, any damage that is due to a blade tilt angle that is too large will no longer occur thereby. In addition, an imbalance due to the removal of component segments in the repaired rotor region and the mass reduced thereby will be prevented or at least greatly reduced by means of the coating, i.e., an addition of mass.

In one embodiment of the method, the blade tilt angle can be adjusted in a defined manner by means of the layer thickness of the coating. Preferably, the tilt angle after the repair by means of the coating will be limited, at least substantially, to a region that corresponds to the tilt angle before the repair.

According to a preferred repair application, at least one rotor segment that has been subjected to wear is removed in a region underneath a blade platform.

The coating is preferably introduced onto at least one radial projection of the component facing the blade platform and forms a bearing surface, which can be introduced in the unit with the supporting surface of the blade platform for limiting the blade tilt angle. The coating thus can be formed as a local dimension-correcting layer for limiting the blade tilt.

In a concrete embodiment, the rotor is formed as a compressor rotor and the blades are formed as compressor blades. Thus, the compressor rotor has at least one annular groove underneath the blade platform of the compressor blades for the uptake of a ring element, such as, for example, a damping ring for damping a blade tilt and/or a retaining ring for axially securing the blades, whereby at least one worn segment of a side wall of the annular groove is removed. For example, the back side wall on the turbine side may have a damaged region, which is removed. After the removal of the worn support segment of the first side wall, the at least one blade in the region of the removed segment would have an inadmissibly large tilt angle. Therefore, the coating is introduced onto a second side wall of the annular groove disposed opposite to the first side wall. The second side wall can be the front side wall on the inlet side of the annular groove. The coating thickness is formed corresponding to the desired tilt angle of the blade. Within the scope of this example of embodiment, tilt angle is understood to be a pivoting angle of the blade in the axial direction. In this way, after a repair of the compressor rotor, for example of an aircraft gas turbine, damage to the compressor blades can no longer occur. Operating safety is considerably improved thereby and the service life of the component is not adversely affected by the repair.

It has been demonstrated as particularly advantageous if the coating is introduced on an outer peripheral surface of the second side wall. In this way, the coating forms the bearing surface for the blade platform, this surface limiting the blade tilt. Even with a thin layer buildup, a good support and a defined limiting of the tilt angle can be achieved thereby.

The coating is preferably introduced onto a region whose length extends along the periphery over a length that at least corresponds to the length of the removed segment. In this way, the at least one blade in the region of the repair site is supported along its entire peripheral width. Wear and damage to the contact partner will be reduced or avoided thereby.

In a particularly preferred example of embodiment of the invention, the coating is produced by means of a spraying method, in particular by means of a thermal spraying method, preferably as kinetic cold spraying or plasma spraying.

With the removal of the worn segment, preferably a notching or rounding out is formed, which satisfies the highest requirements with respect to the resulting component strength.

A component of a turbomachine according to the invention, in particular a rotor of an aircraft gas turbine, has at least one site repaired according to the claimed method. In a solution with ring elements, such as damping rings, for example, preferably at least one ring element is disposed axially in front of a series of blades and at least one ring element is disposed axially behind a series of blades of the compressor blading.

Other advantageous enhancements of the invention are components of the dependent claims.

BRIEF DESCRIPTION OF THE SEVERAL VIEWS OF THE DRAWINGS

Figure 1:
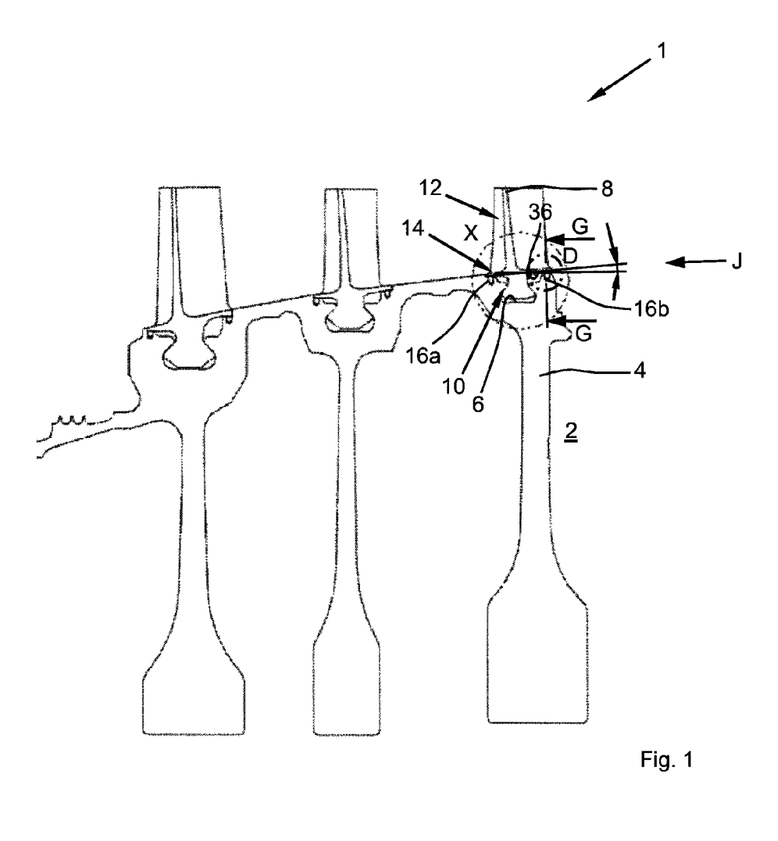
FIG. 1 shows a sectional view of an aircraft gas turbine in the region of the high-pressure compressor.

A preferred example of embodiment of the invention will be explained in more detail in the following on the basis of schematic drawings. Herein:

FIG. 1 shows by way of example the application of the repair method according to the invention in the region of a high-pressure compressor 1 of an aircraft gas turbine 2. The invention, however, is not limited to repair applications in this region; rather the method can also be used advantageously in other regions.

The high-pressure compressor 1 has a compressor rotor 4 with compressor blades 8 taken up in rotor grooves 6. This is explained by way of example based on the third compressor stage in FIG. 1 of three sequential compressor stages in axial construction of high-pressure compressor 1.

Compressor blades 8 each have a form-fitted blade root 10, which is taken up in rotor groove 6, a blade surface 12, and a blade platform 14 disposed in the transition region between blade root 10 and blade surface 12. Ring elements 16 formed as damping rings are disposed between the compressor rotor 4 and the blade platforms 14, whereby to each compressor stage is assigned a damping ring 16a axially in front in a series of blades of the compressor blading and a damping ring 16b is assigned axially in back in the series of blades of the compressor blading. This can be further derived from FIG. 2, which shows an enlarged detail view of the excerpt X of FIG. 1.

Figure 2:
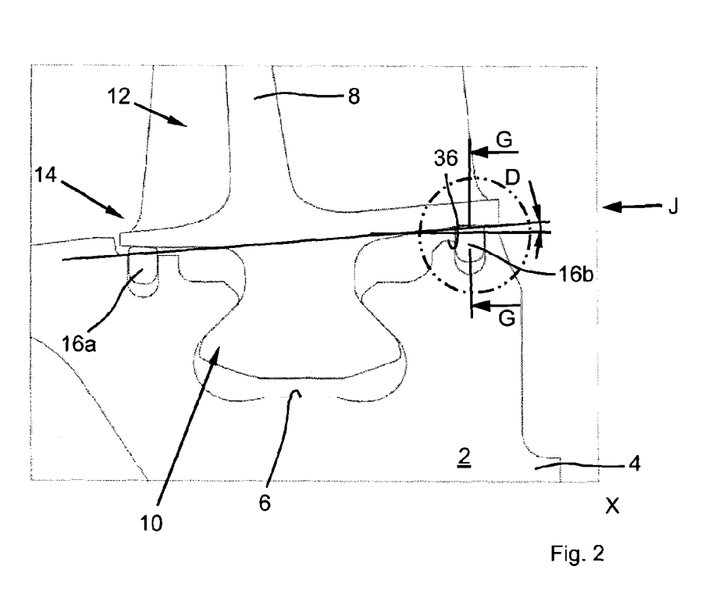
FIG. 2 shows an enlarged detail view of the excerpt X of FIG. 1.
Figure 3:
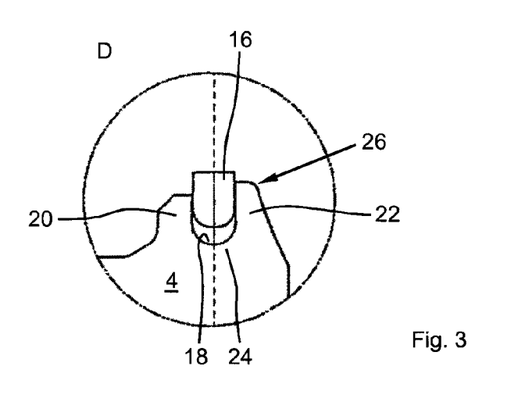
FIG. 3 shows an enlarged detail view of the excerpt D of FIG. 2.

As can be particularly derived from FIG. 3, which shows an enlarged detail view of excerpt D of FIG. 2, the damping rings 16 are each disposed in an approximately U-shaped annular groove 18, which is radially open to the outside, of compressor rotor 4. The damping rings 16 have a circular damping-ring base body with a roughly rectangular cross section and rounded corner regions as well as two adjacent ring ends, which are not shown. The annular groove 18 is bounded by two parallelly extending side walls 20, 22 and a bottom wall 24. A front side wall 20 on the inlet side is set back radially opposite a back side wall 22 on the turbine side, so that the back side wall 22 projects radially and forms a support region 26 for the blade platforms 14 of the compressor blades 8 (see FIG. 1).

In the example of embodiment shown, the repair is made in a damaged region of the back side wall 22 on the turbine side. For this purpose, as can be derived in particular from FIGS. 4 and 5, which show a detail view of the compressor rotor 4 in the direction of view J of FIG. 2 and a sectional view of compressor rotor 4 along line G-G of FIG. 2, a section 28 of back side wall 22 which has been subjected to wear, i.e., of the support region 26 of compressor rotor 4, is removed in a first method step. With the removal of the worn segment 28, a depression or notching or rounding out 30 is formed, which satisfies the highest requirements with respect to the resulting component strength.

Figure 4:
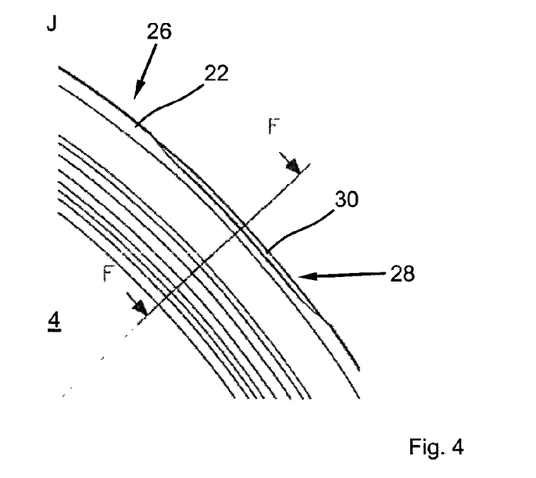
FIG. 4 shows a detail view of the compressor rotor in the direction of view J of FIG. 2.
Figure 5:
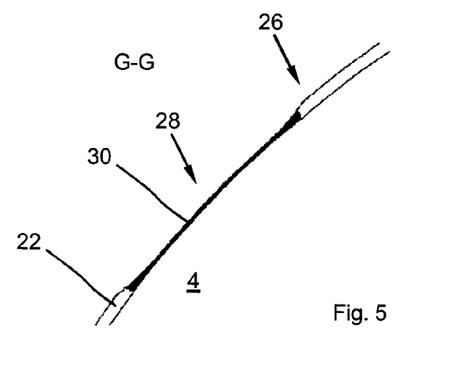
FIG. 5 shows a sectional view of the compressor rotor along line G-G of FIG. 2.
Figure 6:
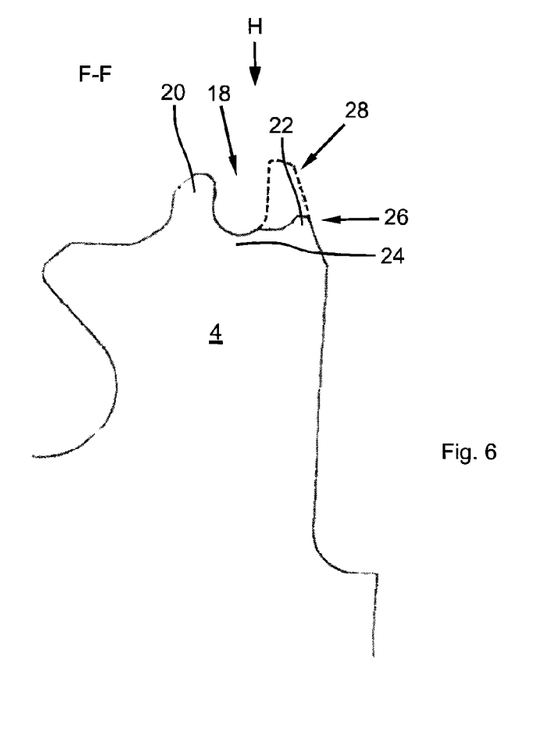
FIG. 6 shows a sectional view of the compressor rotor along line F-F of FIG. 4.

As can be derived from FIG. 6, which shows a sectional view of the compressor rotor 4 along line F-F of FIG. 4, the back side wall 22—the original contour of side wall 22 is indicated by means of dashes—is removed in the repair, except for a relatively small projection, by means of a mechanical, cutting or non-cutting processing. The edges are rounded by means of shot peening.

Figure 7:
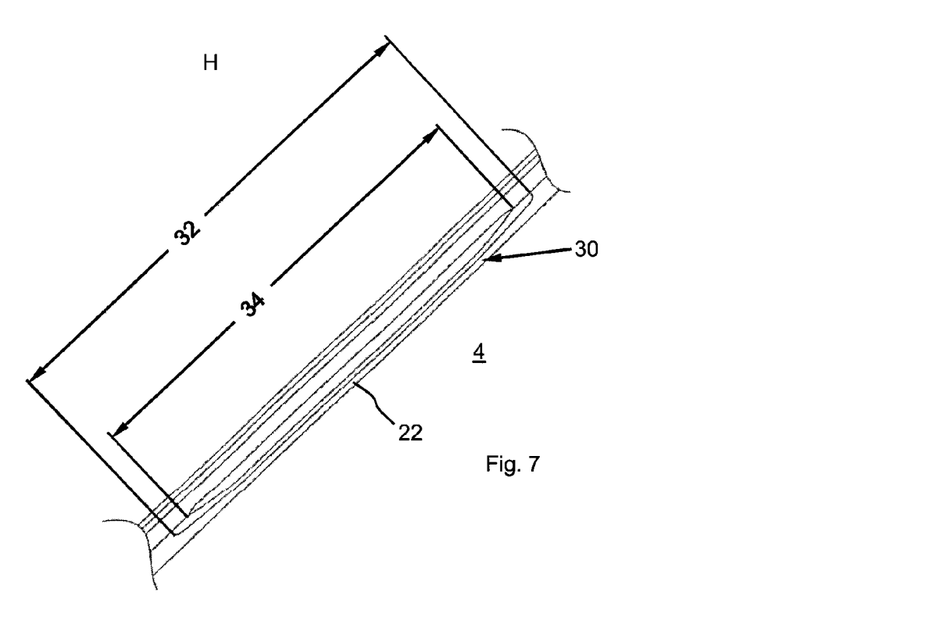
FIG. 7 shows a top view H of FIG. 6.

It can be seen from FIG. 7, which shows a top view H of FIG. 6, that a peripheral depression 32 is larger than an axial depression 34. The depression 30 has overall an approximately lens-shaped cross section. In the region of depression 30, compressor blade 8 would have an inadmissibly large blade tilt angle α after the removal of the worn segment of the back side wall 22 (see FIG. 2).

Figure 8:
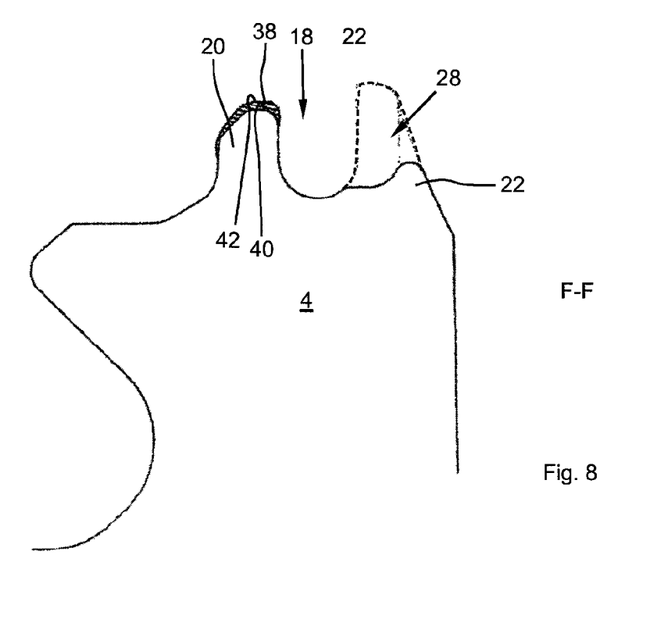
FIG. 8 shows a sectional view of the compressor rotor along line F-F of FIG. 4 after the repair.

As can be derived from FIG. 8, which shows a sectional view of the compressor rotor 4 along line F-F of FIG. 4 after the repair, a coating 38, which can be introduced in the unit on a supporting surface 36 of the blade platform 14 (see FIG. 2) is formed for limiting the blade tilt angle α. The coating 38 is introduced by means of a plasma spraying process onto an outer peripheral surface 40 of the front side wall 20 of annular groove 18 and forms a bearing surface 42, which limits the blade tilt and which can be introduced into the unit with the supporting surface 36 of the blade platform 14 for limiting the tilt angle of blade 8. The coating 38 thus can be formed as a local dimension-correcting layer for limiting the blade tilt. Even with a thin layer buildup, a good support and a defined limiting of the tilt angle α can be achieved thereby. The coating thickness is formed corresponding to the allowable tilt angle α of blade 8. In this way, after a repair of the compressor rotor 4, damage to the compressor blade 8 that is caused by the tilt angle can no longer occur. In addition, an imbalance due to the removal of component segments in the repaired rotor region and the mass reduced thereby will be prevented or at least greatly reduced by means of the coating, i.e., an addition of mass. Operating safety is considerably improved and a longer component service life will be achieved.

Figure 9:
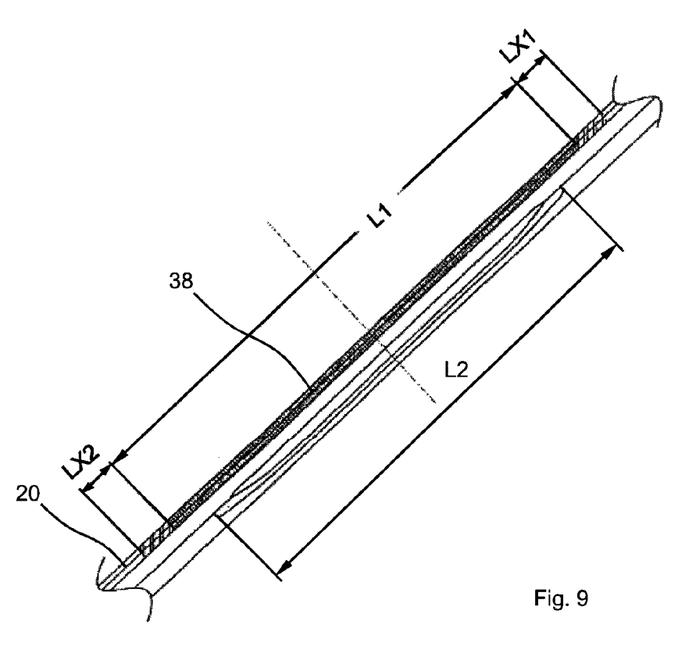
FIG. 9 shows a top view H of FIG. 6 after the repair.

As is shown in FIG. 9, which shows a top view H of FIG. 6 after the repair, the coating 38 is introduced onto a region of side wall 20, which extends along the periphery over a length L1 that at least corresponds to the length L2 of the removed segment. It is preferred if the coating 38 has a longer length L1 in comparison to the notching. The coating may thus have a coating run-out LX1, LX2 on both sides. The compressor blade 8 can be supported thereby along its entire peripheral width in the region of the repair site, so that the blade tilt angle α is limited in a defined manner.

A method is disclosed for the repair of a component 4 of a turbomachine, in particular a rotor of an aircraft gas turbine 1, with blades 8 taken up in at least one groove 6 and with at least one support region 26 for limiting a blade tilt angle α, whereby at least one worn segment 28 of the support region 26 of the component is removed, and a coating that can be introduced in the unit on at least one supporting surface of at least one blade is formed on component 4 for limiting the blade tilt angle α. In addition, a component 4 of a turbomachine, in particular a rotor of an aircraft gas turbine 1 with at least one such repair site is disclosed.

The invention claimed is:

1. A method for the repair of a rotor of an aircraft gas turbine, with blades (8) taken up in at least one groove (6) and with at least one support region (26) for blades (8) for limiting a blade tilt angle α, comprising the steps of:

providing a rotor having at least one annular groove, the at least one annular groove having side walls, removing at least one segment (28), which has been subjected to wear, of a first support region (26) adjacent to the annular groove, and forming a coating (38) that can be introduced in the unit on at least one supporting surface (36) of a second support region for engaging at least one blade (8) for limiting the blade tilt angle α, the coating forming a bearing surface on the at least one supporting surface, wherein the bearing surface limits the blade tilt angle α more than the supporting surface would without the coating applied thereon.

2. The method according to claim 1, wherein the at least one segment (28) of the first support region (26), which is disposed under a blade platform (14) of blade (8) is removed.

3. The method according to claim 2, wherein a coating (38) is introduced on at least one region of rotor (4) facing the blade platform (14) and forms a bearing surface (42), which can be introduced in the unit with the supporting surface (36) of the blade platform (14) for limiting the blade tilt angle α.

4. The method according to claim 1, with a rotor formed as a compressor rotor (4) and blades formed as compressor blades (8), wherein each at least one annular groove (18) is configured for the uptake of a ring element (16), in particular a damping and/or retaining ring, and wherein the at least one segment, which has been subjected to wear, forms a portion of a side wall (22) of the annular groove and is removed.

5. The method according to claim 4, wherein the coating (38) is introduced onto a second side wall (20) of the annular groove (18) disposed on an opposite side of the annular groove from the side wall (22).

6. The method according to claim 5, wherein the coating (38) is introduced onto a radially outer peripheral surface (40) of the second side wall (20), with respect to the center of the rotor.

7. The method according to claim 1, wherein the coating (38) is introduced onto a region that preferably extends along a periphery of the rotor over a length L1 that at least corresponds to the length L2 of the removed segment (28).

8. The method according to claim 1, wherein the coating (38) is introduced by spraying.

9. The method according to claim 1, wherein a notching (30) and/or rounding out is formed by means of the removal of the segment (28).

* * * * *